US012650966B2

(12) United States Patent
Yang et al.

(10) Patent No.: US 12,650,966 B2
(45) Date of Patent: Jun. 9, 2026

(54) VECTOR RETRIEVAL METHODS AND APPARATUSES, DEVICES, AND STORAGE MEDIA

(71) Applicant: Alipay (Hangzhou) Information Technology Co., Ltd., Hangzhou (CN)

(72) Inventors: Mingyu Yang, Hangzhou (CN); Jiabao Jin, Hangzhou (CN); Xiangyu Wang, Hangzhou (CN); Xiaoyao Zhong, Hangzhou (CN); Zhitao Shen, Hangzhou (CN); Wei Jia, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/979,332

(22) Filed: Dec. 12, 2024

(65) Prior Publication Data

US 2026/0030227 A1     Jan. 29, 2026

(30) Foreign Application Priority Data

Jul. 25, 2024     (CN) .......................... 202411008291.9

(51) Int. Cl.
G06F 16/00          (2019.01)
G06F 16/22          (2019.01)
G06F 16/28          (2019.01)

(52) U.S. Cl.
CPC ........ G06F 16/2237 (2019.01); G06F 16/285 (2019.01)

(58) Field of Classification Search
CPC .. G06F 16/3347; G06F 16/906; G06F 16/285; G06F 16/901; G06F 18/22;

(Continued)

(56) References Cited

U.S. PATENT DOCUMENTS

2006/0184516 A1*   8/2006   Ellis ................... G06F 16/9538
2012/0051628 A1*   3/2012   Noguchi ............. G06V 10/757
                                              382/159

(Continued)

FOREIGN PATENT DOCUMENTS

CN          115129949 A      9/2022
WO          2024065692 A1    4/2024

OTHER PUBLICATIONS

Extended European Search Report in European Appln. No. 24220007.9, mailed on Apr. 28, 2025, 11 pages.

(Continued)

Primary Examiner — Shyue Jiunn Hwa
(74) Attorney, Agent, or Firm — Fish & Richardson P.C.

(57)          ABSTRACT

This application provides vector retrieval methods, and apparatuses, and storage media. In an example, in response to a query vector, at least one compressed vector having a highest similarity with the query vector is obtained from a first-level storage resource. Classification decision-making is performed on each compressed vector based on a classification model to obtain at least one target compressed vector whose corresponding original vector is a candidate vector most similar to the query vector. At least one target original vector corresponding to the at least one target compressed vector is obtained from a second-level storage resource. At least one similarity between the query vector and the at least one target original vector is calculated. The at least one target original vector is sorted based on the similarity, based on which, a vector retrieval result corresponding to the query vector is determined.

21 Claims, 3 Drawing Sheets

(58) Field of Classification Search

CPC .......... G06F 16/2237; G06F 16/24578; G06F 16/41; G06F 16/45; G06F 16/48; G06F 17/16; G06F 16/137; G06F 16/248; G06F 16/122; G06F 16/162; G06F 16/17; G06F 16/173; G06F 16/174; G06F 16/215; G06F 16/235; G06F 16/254; G06F 16/288; G06F 16/29; G06F 16/35; G06F 16/355; G06F 16/50; G06F 16/903; G06N 20/00; G06N 5/00; G06N 99/00

See application file for complete search history.

(56) References Cited

U.S. PATENT DOCUMENTS

| | | | |
|---|---|---|---|
| 2019/0179858 A1 | 6/2019 | Douze et al. | |
| 2020/0311077 A1 | 10/2020 | Zhang et al. | |
| 2021/0200768 A1* | 7/2021 | Lesner ................ | G06F 16/2237 |
| 2022/0321566 A1* | 10/2022 | Coyle ................... | H04L 63/101 |
| 2025/0005896 A1* | 1/2025 | Liu ........................ | G06V 10/82 |

OTHER PUBLICATIONS

Github.com [online], "SPTAG: A library for fast approximate nearest neighbor search," available on or before Jul. 21, 2024, via Internet Archive: Wayback Machine URL<https://web.archive.org/web/20240721175620/https://github.com/microsoft/SPTAG>, retrieved on Jun. 6, 2025, retrieved from URL<https://github.com/microsoft/SPTAG>, 6 pages.

Microsoft.com [online], "DiskANN: Vector Search for Web Scale Search and Recommendation," available on or before Jun. 7, 2024, via Internet Archive: Wayback Machine URL<https://web.archive.org/web/20240607113819/https://www.microsoft.com/en-US/research/project/project-akupara-approximate-nearest-neighbor-search-for-large-scale-semantic- search/>, retrieved on Jun. 6, 2025, retrieved from URL<https://www.microsoft.com/en-US/research/project/project-akupara-approximate-nearest-neighbor-search-for-large-scale-semantic-search/>, 2 pages.

* cited by examiner

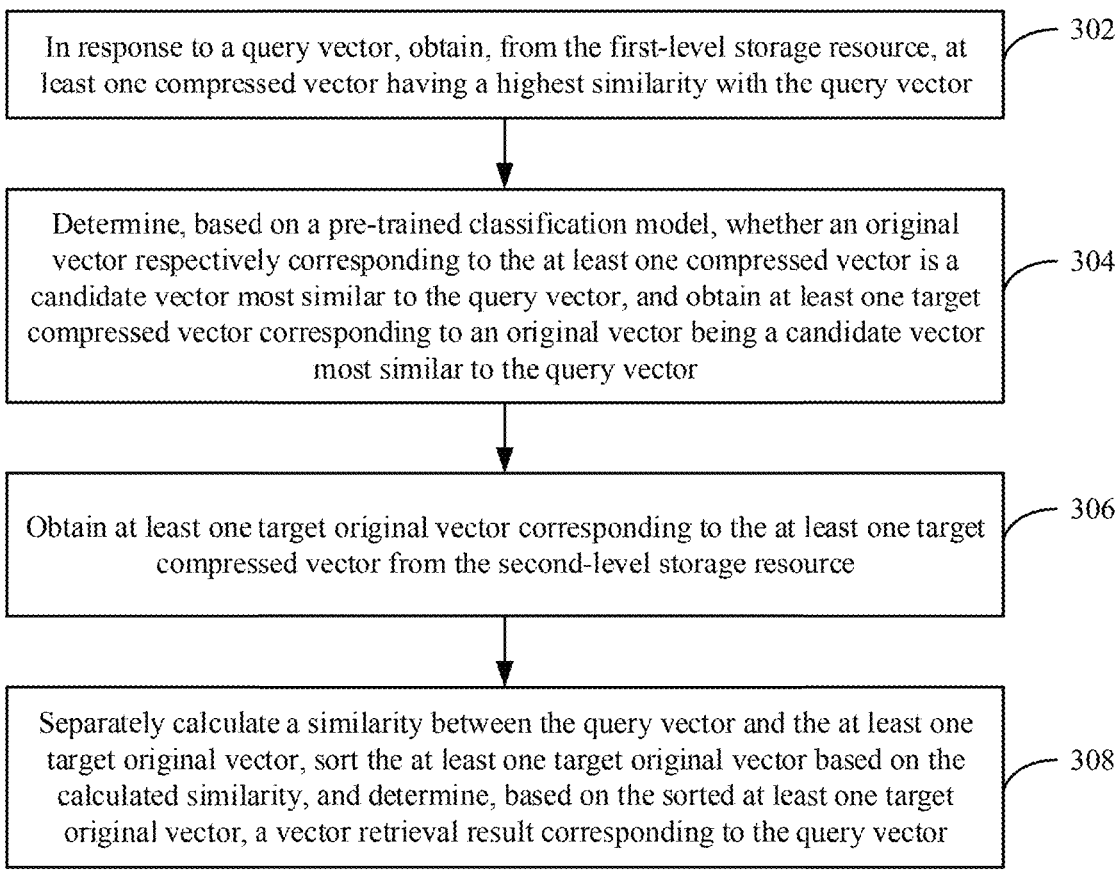

In response to a query vector, obtain, from the first-level storage resource, at least one compressed vector having a highest similarity with the query vector — 302

Determine, based on a pre-trained classification model, whether an original vector respectively corresponding to the at least one compressed vector is a candidate vector most similar to the query vector, and obtain at least one target compressed vector corresponding to an original vector being a candidate vector most similar to the query vector — 304

Obtain at least one target original vector corresponding to the at least one target compressed vector from the second-level storage resource — 306

Separately calculate a similarity between the query vector and the at least one target original vector, sort the at least one target original vector based on the calculated similarity, and determine, based on the sorted at least one target original vector, a vector retrieval result corresponding to the query vector — 308

FIG. 3

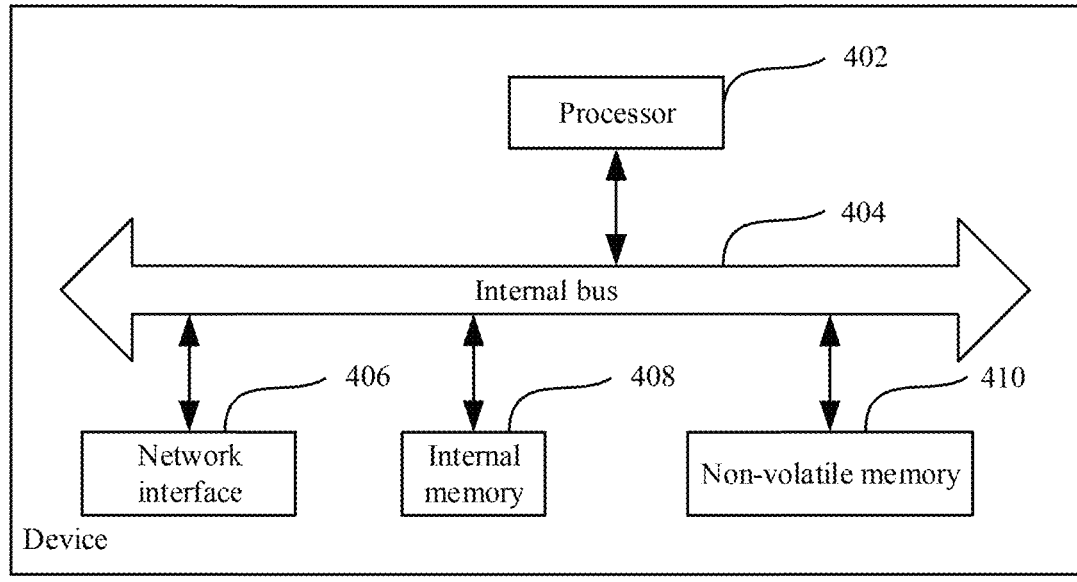

FIG. 4

VECTOR RETRIEVAL METHODS AND APPARATUSES, DEVICES, AND STORAGE MEDIA

CROSS-REFERENCE TO RELATED APPLICATIONS

This application claims priority to Chinese Patent Application No. 202411008291.9, filed on Jul. 25, 2024, which is hereby incorporated by reference in its entirety.

TECHNICAL FIELD

One or more embodiments of this application relate to the field of database technologies, and in particular, to vector retrieval methods and apparatuses, devices, and storage media.

BACKGROUND

Vector retrieval is a technology for searching a high-dimensional space for vectors that are most similar to a given query vector. This technology is used in many fields, including but not limited to computer vision, natural language processing, recommendation systems, and information retrieval. In vector retrieval, data are typically represented as multidimensional vectors that exist in a multidimensional space, each dimension can represent one feature, and then similarity measurement is performed on these vectors to find the most similar vectors. The objective of vector retrieval is to find a group of vectors in a large vector database that are most similar to a query vector.

An existing vector retrieval solution generally has a relatively high delay. Therefore, how to reduce the delay of vector retrieval becomes an urgent problem to be solved.

SUMMARY

One or more embodiments of this application provide the following technical solutions:

This application provides a vector retrieval method, where a compressed vector corresponding to an original vector is stored in a first-level storage resource; the original vector is stored in a second-level storage resource; data access performance of the first-level storage resource is higher than data access performance of the second-level storage resource; and the method includes: in response to a query vector, obtaining, from the first-level storage resource, at least one compressed vector having a highest similarity with the query vector; determining, based on a pre-trained classification model, whether an original vector respectively corresponding to the at least one compressed vector is a candidate vector most similar to the query vector, and obtaining at least one target compressed vector corresponding to an original vector being a candidate vector most similar to the query vector; obtaining at least one target original vector corresponding to the at least one target compressed vector from the second-level storage resource; and respectively calculating a similarity between the query vector and the at least one target original vector, sorting the at least one target original vector based on the calculated similarity, and determining, based on the sorted at least one target original vector, a vector retrieval result corresponding to the query vector.

This application further provides a vector retrieval apparatus, where a compressed vector corresponding to an original vector is stored in a first-level storage resource; the original vector is stored in a second-level storage resource; data access performance of the first-level storage resource is higher than data access performance of the second-level storage resource; and the apparatus includes: a first acquisition module, configured to: in response to a query vector, obtain, from the first-level storage resource, at least one compressed vector having a highest similarity with the query vector; a classification decision module, configured to: determine, based on a pre-trained classification model, whether an original vector respectively corresponding to the at least one compressed vector is a candidate vector most similar to the query vector, and obtain at least one target compressed vector corresponding to an original vector being a candidate vector most similar to the query vector; a second acquisition module, configured to obtain at least one target original vector corresponding to the at least one target compressed vector from the second-level storage resource; and a determining module, configured to: respectively calculate a similarity between the query vector and the at least one target original vector, sort the at least one target original vector based on the calculated similarity, and determine, based on the sorted at least one target original vector, a vector retrieval result corresponding to the query vector.

This application further provides an electronic device, including: a processor; and a memory, configured to store instructions executable by the processor; where the processor runs the executable instructions to implement the steps of the method according to any item described above.

This application further provides a computer-readable storage medium. Computer instructions are stored on the computer-readable storage medium, and the instructions are executed by a processor to implement the steps of the method according to any item described above.

In the above-mentioned technical solutions, a compressed vector corresponding to an original vector can be stored in a first-level storage resource, and the original vector is stored in a second-level storage resource. In addition, it is ensured that data access performance of the first-level storage resource is higher than data access performance of the second-level storage resource. In this case, in response to a query vector, at least one compressed vector having a highest similarity to the query vector can be obtained from the first-level storage resource, and classification decision-marking is first performed on each compressed vector by using a pre-trained classification model, so as to obtain at least one target compressed vector whose corresponding original vector is a candidate vector most similar to the query vector. Then, at least one target original vector corresponding to the at least one target compressed vector is obtained from the second-level storage resource. Subsequently, a similarity between the query vector and the at least one target original vector can be respectively calculated, and the at least one target original vector is sorted based on the calculated similarity, so as to determine, based on the sorted at least one target original vector, a vector retrieval result corresponding to the query vector.

In the above-mentioned manner, a quantity of compressed vectors of a corresponding original vector that need to be obtained from the second-level storage resource whose data access performance is limited can be reduced, so a quantity of times of data access performed for the second-level storage resource and a data volume can be reduced. Thus, a delay of vector retrieval can be reduced.

BRIEF DESCRIPTION OF DRAWINGS

The following describes the accompanying drawings to be used in the description of example embodiments, where:

FIG. 3 is a flowchart illustrating a vector retrieval method, according to an example embodiment of this application;

FIG. 4 is a schematic structural diagram illustrating a device, according to an example embodiment of this application.

DESCRIPTION OF EMBODIMENTS

Figure 1:
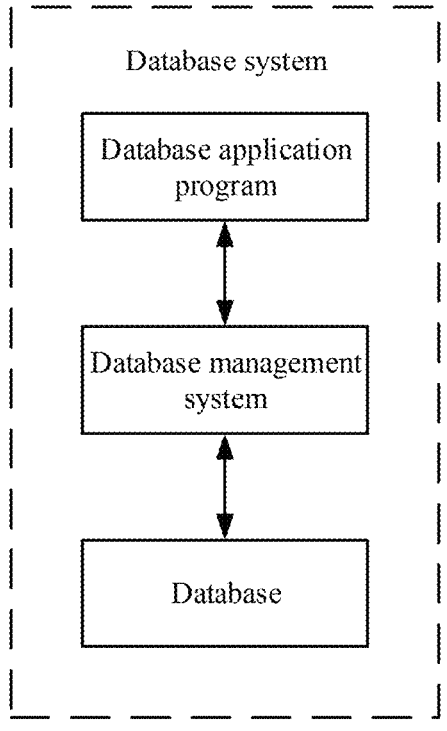
FIG. 1 is a schematic architectural diagram illustrating a database system, according to an example embodiment of this application.

Example embodiments are described in detail here, and examples of the example embodiments are presented in the accompanying drawings. When the following description relates to the accompanying drawings, unless specified otherwise, the same numbers in different accompanying drawings represent the same or similar elements. Implementations described in the following example embodiments do not represent all implementations consistent with one or more embodiments in this application. In contrast, they are merely examples consistent with some aspects of one or more embodiments of this application.

It is worthwhile to note that, in other embodiments, steps of a corresponding method are not necessarily performed based on a sequence shown and described in this application. In some other embodiments, the method can include more or fewer steps than that described in this application. In addition, a single step described in this application may be split into a plurality of steps in other embodiments for description; and a plurality of steps described in this application may be combined into a single step in other embodiments for description.

Vector retrieval is a technology for searching a high-dimensional space for a vector that is most similar to a given query vector. This technology is used in many fields, including but not limited to computer vision, natural language processing, recommendation systems, and information retrieval. In vector retrieval, data are typically represented as multidimensional vectors that exist in a multidimensional space, each dimension can represent one feature, and then similarity measurement is performed on these vectors (e.g., calculating the distance between these vectors) to find the most similar vectors. The objective of vector retrieval is to find a group of vectors in a large vector database that are most similar to a query vector.

Vector retrieval can be divided into two main types, exact nearest neighbor search (ENS) and approximate nearest neighbor search (ANNS). Exact nearest neighbor search returns a point exact nearest to a query vector. However, in a high-dimensional space, exact nearest neighbor search may be time consuming because a similarity between the query vector and each vector in a vector database needs to be calculated. Thus, approximate nearest neighbor search is often used in practical applications to quickly find a vector relatively most similar to the query vector, but do not guarantee that an absolute most similar vector is found. Approximate nearest neighbor search accelerates a search process by organizing data into a particular index structure, such as a K-dimensional tree, a hash table, or a hierarchical navigable small world graph (HNSW).

The HNSW algorithm is an internal memory-based, efficient solution to approximate nearest neighbor search problems, especially applicable to large-scale data sets in a high-dimensional space. The HNSW algorithm combines characteristics of a small world network and a multi-level index structure to achieve fast and accurate search. The small world network is a graph formed by some nodes and connections between them, and has two important features: a short path length and a high clustering coefficient. The short path length means that a shortest path length between any two nodes is usually very small, even when a network size is large. The high clustering coefficient means that nodes in a network tend to form dense local clusters.

The HNSW algorithm constructs a multi-level graph index, where each layer includes a sub-graph, and sub-graphs of a higher layer are sparser than those of a lower layer. Each node (representing a high-dimensional vector) can have multiple links at different layers, which enables the algorithm to search globally to locally, thereby rapidly converging to a nearest neighbor node.

An HNSW graph is formed by multiple layers, each layer contains fewer nodes, and the lowest layer contains all nodes. In each layer, nodes form a connected graph where each point is connected to a specific quantity of neighbor points called links. Link density of each layer generally increases gradually. As such, gradually from a higher layer to a lower layer until the lowest layer during search, a quantity of candidate points that need to be checked is reduced.

An index establishment process in the HNSW algorithm can include: selecting a node as a root node, and starting to construct the highest layer of the HNSW graph; and when a new node needs to be inserted, starting from the highest layer, randomly selecting a point as a start point, and then moving to a lower layer by using a greedy policy until a proper position is found for inserting the new point. During insertion, the algorithm calculates the distance between the new point and each point in the current layer (representing the distance between corresponding vectors) and determines whether a new link is to be established.

A search process in the HNSW algorithm can include: starting search from the highest level, and selecting an entry point. The entry point can be randomly selected, or can be selected by using a policy, for example, selecting a known point closest to a query point. In a current layer, all nodes connected to the entry point are checked, distances between these nodes and the query point are calculated, a node closest to the query point is selected as the target of next search, and the next layer is moved to. This process is repeated. In each layer, the algorithm traverses neighbor nodes of a current node, searches for a node closer to the query point, if a node closer to the query point is found, sets the node as the current node, and continues to search in this layer. Finally, the search will reach the lowest layer, which contains all nodes. In this layer, the search process will traverse nodes adjacent to the current best node again to further narrow the nearest neighbor range. Throughout the search process, the algorithm records several candidate points that are closest to the query point. When the search is complete, the candidate points are sorted according to the distances from the query point, and the nearest point is considered as an approximate nearest neighbor of the query point.

Due to the multi-level structure and short path length, the HNSW algorithm can implement fast approximate nearest neighbor search in a high-dimensional space. Moreover, the HNSW algorithm can efficiently process large-scale datasets because it only needs to maintain a small quantity of links associated with each node.

The disk-based approximate nearest neighbor (DiskANN) solution is a disk-based vector retrieval solution.

The DiskANN algorithm is an approximate nearest neighbor search algorithm, and is particularly suitable for processing large-scale high-dimensional data sets that cannot be fully loaded into an internal memory. Conventional approximate nearest neighbor search is usually performed entirely in the internal memory, and when the data set is too large to be fully stored in the internal memory, conventional approximate nearest neighbor search is no longer applicable. The DiskANN algorithm overcomes this limitation by storing data in the internal memory and the disk by layers and using multi-level indexes.

Using a hierarchical storage structure, the DiskANN algorithm keeps the most frequently accessed data in the internal memory, while storing less active data in the disk, enabling it to process data sets much larger than the internal memory. The DiskANN algorithm can also use the HNSW graph index to quickly locate a nearest neighbor, and the complete HNSW graph index is usually stored in the disk. Therefore, for the DiskANN algorithm, a disk input/output (I/O) operation needs to be performed for multiple times in the search process, and the disk I/O operation executed is a synchronous I/O operation, that is, after an I/O request for the disk is initiated each time, it is necessary to wait for a corresponding I/O result, so as to determine the target of next search by using the HNSW graph index stored in the disk.

An existing vector retrieval solution, such as the DiskANN algorithm, generally needs to perform a synchronous disk I/O operation for multiple times in the search process. Therefore, these vector retrieval solutions generally have a relatively high disk I/O cost, that is, a relatively large quantity of disk resources are consumed when the I/O operation is executed, and it is also more time-consuming, which causes a relatively high delay of the vector retrieval.

Shared storage is a storage resource shared between multiple computers. This storage mode allows multiple servers or workstations on a network to access the same dataset without having to copy data on each node. Shared storage is a key component in many IT architectures and system designs, especially in data centers, cloud computing environments, and high-performance computing scenarios. The main purpose of shared storage is to improve data availability, accessibility, and fault tolerance.

Shared storage can be classified according to different technologies, including network attached storage (NAS), storage area network (SAN), object storage, software-defined storage (SDS), distributed file system (DFS), cloud storage, etc.

Shared storage features a high delay and a high throughput. Applying an existing vector retrieval solution in an application scenario of shared storage generally means storing a vector database in shared storage. In practice, a storage medium of shared storage is usually a disk. Therefore, in addition to a disk I/O cost of the existing vector retrieval solution, a data packet may need to be transmitted on a network in an application scenario of shared storage, resulting in an additional network I/O cost, that is, an additional network resource and time may need to be consumed when an I/O operation is performed, thereby further increasing the delay of vector retrieval. In addition, because shared storage itself has a characteristic of a high delay, applying an existing vector retrieval solution in an application scenario of shared storage further increases the delay of shared storage, which may cause that it is difficult for a user to accept the delay of shared storage, affecting user experience of shared storage. Therefore, the existing vector retrieval solution has poor adaptation to shared storage.

This application provides a vector retrieval technical solution, aiming to reduce the delay of vector retrieval. In addition, a vector retrieval solution with a reduced latency can be well adapted to shared storage.

In the vector retrieval solution provided in this application, a compressed vector corresponding to an original vector can be stored in a first-level storage resource, and the original vector is stored in a second-level storage resource. In addition, it is ensured that data access performance of the first-level storage resource is higher than data access performance of the second-level storage resource. In this case, in response to a query vector, at least one compressed vector having a highest similarity to the query vector can be obtained from the first-level storage resource, and classification decision-marking is first performed on each compressed vector by using a pre-trained classification model, so as to obtain at least one target compressed vector whose corresponding original vector is a candidate vector most similar to the query vector. Then, at least one target original vector corresponding to the at least one target compressed vector is obtained from the second-level storage resource. Subsequently, a similarity between the query vector and the at least one target original vector can be respectively calculated, and the at least one target original vector is sorted based on the calculated similarity, so as to determine, based on the sorted at least one target original vector, a vector retrieval result corresponding to the query vector.

In the above-mentioned manner, a quantity of compressed vectors of a corresponding original vector that need to be obtained from the second-level storage resource whose data access performance is limited can be reduced, so a quantity of times of data access performed for the second-level storage resource and a data volume can be reduced. Thus, a delay of vector retrieval can be reduced.

Referring to FIG. 1, FIG. 1 is a schematic architectural diagram illustrating a database system, according to an example embodiment of this application.

The database system is a software system for storing, managing and retrieving data. As shown in FIG. 1, the database system can include at least a database, a database management system (DBMS), and a database application program.

The database is a set of actually stored data. Data are organized in the database according to a specific pattern or model to facilitate retrieval and management. In this application, the database can be specifically a vector database. In the vector database, data are usually represented as multidimensional vectors that exist in a multidimensional space, and each dimension can represent one feature.

The database management system is a software system. It is a core component for controlling and managing the database, and can be used to define, create, maintain, and operate the database. The database management system provides a range of tools and interfaces for managing the database, such as interfaces for create, read, update, and delete operations. The database management system is mainly used to control data storage, retrieval, update, and management, and is also responsible for data accuracy, consistency, security, and backup recovery.

The database application program refers to a front-end application program that interacts with the database, and is used to implement specific service logic and functions. It can provide a user-oriented interface, which can be specifically a graphical user interface, a command line, or another form of interface.

In practice, a user can initiate a specific operation for the database by using the database application program (for example, an index construction operation, a data retrieval operation, etc.), and the database management system can perform these operations for the database.

The database and the database management system can be deployed on a server. The server can be a server that includes one independent physical host, or can be a server cluster that includes multiple independent physical hosts. Or the server can be a virtual server, a cloud server, etc. carried by a host cluster. The database application program can be deployed on a terminal device establishing a network (including multiple types of wired networks or wireless networks) connection to the server. The terminal device can be a personal computer (PC), a desktop computer, a notebook computer, a tablet computer, a smartphone, a personal digital assistant (PDA), etc.

Figure 2:
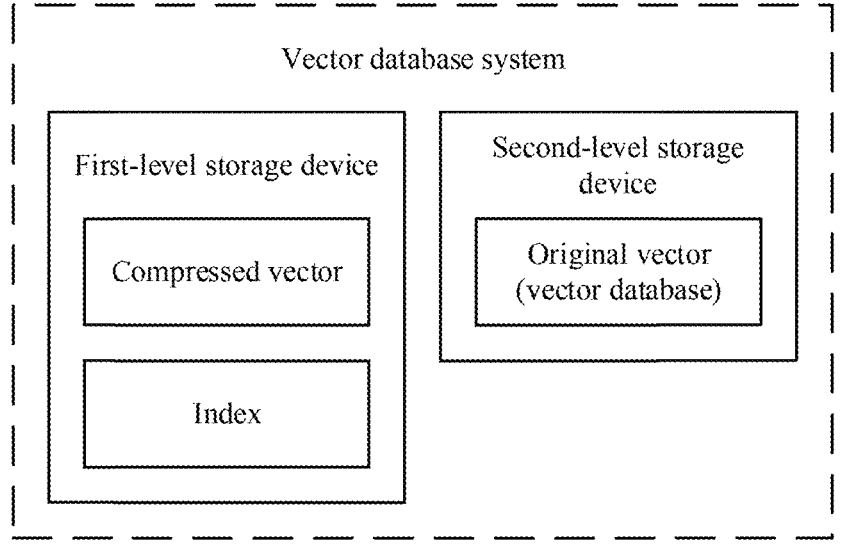
FIG. 2 is a schematic diagram illustrating data deployment of a vector database system, according to an example embodiment of this application.

Referring to FIG. 2, FIG. 2 is a schematic diagram illustrating data deployment of a vector database system, according to an example embodiment of this application;

The vector database system is a database system that is specially used to store, manage, and retrieve data of a vector type. Similar to the database system shown in FIG. 1, the vector database system can also include a vector database and a vector database management system. In practice, the vector database is a set of actually stored vectors, and the vector database management system can maintain an index created for a vector in the vector database, so the vector database management system can use the index to perform vector retrieval, and speed up vector retrieval.

As shown in FIG. 2, in the vector database system, vectors and indexes can be stored in a hierarchical storage manner.

Specifically, on one hand, vectors stored in the vector database can be referred to as original vectors. These original vectors can be stored in a second-level storage resource, that is, the vector database can be deployed in the second-level storage resource.

On the other hand, a compressed vector corresponding to the original vector in the vector database can be calculated to perform preliminary nearest neighbor search based on the compressed vector, thereby reducing calculation complexity and storage needs for the first-level storage resource. All or a part of these compressed vectors can be stored in the first-level storage resource, that is, the vector database management system can maintain all or a part of these compressed vectors in the first-level storage resource.

To increase the speed of the nearest neighbor search, an index can be created for the original vectors in the vector database, and specifically, a graph index can be constructed based on these original vectors. The graph index can be similar to the HNSW graph index. The graph index can also be stored in the first-level storage resource, that is, the vector database management system can also maintain the graph index in the first-level storage resource.

In practice, another type of index can alternatively be created for the original vector in the vector database, which is not specifically limited in this application.

The storage resource refers to various hardware and software systems that are used to store data.

For the graph index, a node in the graph index can represent an original vector, and is associated with a compressed vector corresponding to the original vector represented by the node, for example, the compressed vector corresponding to the original vector represented by the node can be used as a label or an attribute of the node. An edge in the graph index can represent that a similarity relationship exists between original vectors (i.e., original vectors represented by the node) corresponding to nodes connected to the edge.

It is worthwhile to note that the original vector represented by the node in the graph index is not stored in the first-level storage resource, but only the compressed vector associated with the node is stored in the first-level storage resource, so as to reduce occupation of the first-level storage resource. The original vector represented by the node is stored in the second-level storage resource.

In some embodiments, a compressed vector corresponding to an original vector can be a vector obtained after product quantization (PQ) is performed on the original vector.

Product quantization is an effective technology for compressing high-dimensional vectors, mainly used for approximate nearest neighbor search. When an original vector is compressed by using product quantization, a high-dimensional vector space can be first divided into multiple low-dimensional sub-spaces (assume that a dimensionality of the original vector is D, the original vector can be divided into M sub-spaces, and a dimensionality of each sub-space is D/M). For each sub-space, a codebook is constructed by using a clustering algorithm (for example, a K-means algorithm), and each element (which can be referred to as a codeword) in the codebook represents a clustering center of the sub-space. After the original vector is divided into M sub-vectors, a codeword closest to each sub-vector is found in a corresponding sub-space codebook. This process is referred to as quantization, and after quantization, each sub-vector is replaced with a codeword index corresponding to the sub-vector. Finally, the quantized codeword index is stored to form a final compression representation of the original vector, that is, a compressed vector corresponding to the original vector. Because a storage space occupied by the codeword index is generally far less than a storage space occupied by a floating-point value of the original vector, data compression for the original vector is implemented.

Accordingly, the query vector is also divided, quantized, and encoded when approximate nearest neighbor search is performed. Then, search is performed in the codebook index based on similarity measurement of the codeword index to find a possible approximate nearest neighbor.

That is, when nearest neighbor search is performed based on the graph index, similarity measurement is performed for the query vector (specifically a compressed vector corresponding to the query vector) and a compressed vector associated with a node in the graph index, so as to determine at least one compressed vector most similar to the query vector.

It is worthwhile to note that data access performance of the first-level storage resource can be higher than data access performance of the second-level storage resource. That is, a delay of accessing data stored in the first-level storage resource can be lower than a delay of accessing data stored in the second-level storage resource.

In some embodiments, because the processor can directly access the internal memory, but requires an I/O operation to access the disk, a delay in accessing data stored in the internal memory is lower than a delay in accessing data stored in the disk. Therefore, the first-level storage resource can be an internal memory, and the second-level storage resource can be a disk. The disk can be a local disk, or can be a disk that serves as a storage resource of a shared storage service. The shared storage service is a service for providing shared storage, and the storage resource of the shared storage service is shared storage itself.

In practice, the first-level storage resource can be specifically an internal memory of a server used to deploy the vector database management system. The second-level storage resource can be a local disk. That is, the vector database and the vector database management system can be deployed on the same server. In this case, a disk of the server can be used as the second-level storage resource. Or the second-level storage resource can be a remote disk. That is, the vector database can be deployed on a disk connected by using a network to a server used to deploy the vector database management system. In this case, the disk can be used as the second-level storage resource. The remote disk can be implemented by using multiple technologies, such as network attached storage, storage area network, or cloud storage. The remote disk usually needs to be accessed through network protocols such as TCP/IP, iSCSI, NFS, and CIFS. Or the second-level storage resource can be a disk used by a distributed file system, object storage, etc.

In some embodiments, when the graph index is constructed based on the original vector, specifically, on one hand, each node in the graph index can be constructed based on each original vector, that is, each node in the graph index represents each original vector. On the other hand, a similarity between every two original vectors can be calculated, and an edge in the graph index can be constructed based on the calculated similarity. In the graph index, the distance between two nodes can be inversely proportional to a similarity between original vectors respectively represented by the two nodes. If the two nodes are connected by using one edge, it indicates that the similarity between the original vectors respectively represented by the two nodes is relatively high, that is, the original vectors respectively represented by the two nodes are near neighbors to each other, and this edge can represent that a similarity relationship (or referred to as a near neighbor relationship) exists between the original vectors respectively represented by the two nodes.

For the above-mentioned graph index, the first-level storage resource stores the graph index and compressed vectors respectively corresponding to all original vectors.

In some embodiments, when the graph index is constructed based on the original vector, specifically, the original vector can be first divided into at least one vector group, and an aggregation vector corresponding to each vector group is determined.

It is worthwhile to note that, for a vector group, original vectors included in the vector group are similar to each other. That is, original vectors similar to each other in the above-mentioned original vectors can be divided into one vector group. An aggregation vector corresponding to the vector group can be a representative original vector in the original vectors included in the vector group.

Then, on one hand, each node in the graph index can be constructed based on the aggregation vector corresponding to each vector group, that is, each node in the graph index represents each aggregation vector, and a node used to represent each aggregation vector is associated with the vector group corresponding to each aggregation vector. Specifically, each original vector included in each vector group can be converted into a compressed vector corresponding to the original vector, to obtain a vector group including the compressed vector, and a node used to represent each aggregation vector is associated with a compressed vector included in the vector group corresponding to each aggregation vector. On the other hand, a similarity between every two aggregation vectors in these aggregation vectors can be calculated, and the edge in the graph index can be constructed based on the calculated similarity. In the graph index, the distance between two nodes can be inversely proportional to a similarity between aggregation vectors respectively represented by the two nodes. If the two nodes are connected by using one edge, it indicates that the similarity between the aggregation vectors respectively represented by the two nodes is relatively high, that is, the aggregation vectors respectively represented by the two nodes are near neighbors to each other, and this edge can represent that a similarity relationship (or referred to as a near neighbor relationship) exists between the aggregation vectors respectively represented by the two nodes.

In some embodiments, when the original vectors are divided into at least one vector group, and the aggregation vector corresponding to each vector group is determined, the vector group can be obtained through division before the aggregation vector is determined. That is, the original vectors are first divided into at least one vector group, and after all vector groups are obtained through division, one original vector is selected from the original vectors included in each vector group as the aggregation vector corresponding to each vector group. By using any vector group obtained through division as an example, one original vector can be selected from original vectors included in the vector group according to a specific rule or randomly, and used as an aggregation vector corresponding to the vector group.

Or the aggregation vector can be determined before the vector group is obtained through division. That is, at least one original vector is first selected from the original vectors according to a specific rule or randomly as the aggregation vector corresponding to the at least one vector group, where the selected aggregation vector is in a one-to-one correspondence with the vector group, and then an original vector similar to each aggregation vector is added to the vector group corresponding to each aggregation vector. By using any selected aggregation vector as an example, an original vector similar to the aggregation vector in remaining original vectors except these aggregation vectors can be added to a vector group corresponding to the aggregation vector.

In some embodiments, for a vector group obtained through division, original vectors included in the vector group are similar to each other, which means that the similarity between the original vectors included in the vector group is not less than a predetermined first threshold. That is, it can be considered that the original vectors included in the vector group are nearest neighbors to each other. Or a repetition quantity of original vectors whose similarity with each original vector included in the vector group is not less than a predetermined second threshold is not less than a predetermined third threshold, that is, it can be considered that a repetition quantity of nearest neighbors of each original vector included in the vector group is not less than the third threshold.

For the above-mentioned graph index, the first-level storage resource stores the graph index and compressed vectors respectively corresponding to all aggregation vectors (that is, a part of all original vectors).

By performing aggregation processing on the original vector and constructing the graph index based on the aggregation vector, a scale of the graph index can be reduced, so storage overheads of the graph index can be reduced, computing resources consumed when nearest neighbor search is performed based on the graph index can be reduced, and a scale of data that can be processed by a single computer (for example, a quantity of vectors included in a vector database) can be increased.

Referring to FIG. 3, FIG. 3 is a flowchart illustrating a vector retrieval method, according to an example embodiment of this application.

The embodiment shown in FIG. 3 can be applied to the vector database system for storing vectors and indexes in a hierarchical storage manner as shown in FIG. 2.

It is worthwhile to note that in product quantization, one high-dimensional vector is decomposed into several low dimensional vectors, and each low dimensional vector is quantized and represented by one index. Thus, a complete vector can be represented by a combination of these indexes. This quantization method can greatly reduce storage and computation costs, but also introduce errors. Because a part of information is lost in a quantization process, a similarity calculated based on a vector obtained after product quantization may be different from a similarity calculated based on an original vector.

Similarly, a similarity calculated based on a compressed vector obtained in another manner may also be different from the similarity calculated based on the original vector. Therefore, the similarity calculated based on the compressed vector can be referred to as an approximate similarity, and the similarity calculated based on the original vector can be referred to as an exact similarity.

After at least one compressed vector that is most similar to a query vector (which can be relatively most similar) is obtained by using nearest neighbor search, usually at least one original vector corresponding to the at least one compressed vector further needs to be rearranged according to a similarity with the query vector, so as to determine a final vector retrieval result corresponding to the query vector. Thus, the original vector that needs to be rearranged can be referred to as a candidate vector most similar to the query vector.

As shown in FIG. 3, the vector retrieval method can include the following steps:

Step 302: In response to a query vector, obtain, from the first-level storage resource, at least one compressed vector having a highest similarity with the query vector.

In this embodiment, in a case in which a query vector used to perform vector retrieval in the vector database is obtained, a response can be made thereto. Specifically, the at least one compressed vector having a highest similarity with the query vector can be obtained from the first-level storage resource by performing nearest neighbor search based on the graph index.

It is worthwhile to note that in K-nearest neighbor search, the K value usually refers to a quantity of nearest neighbors to be searched. In this application, the K value can be predetermined according to an actual need. In this case, K (it can alternatively be greater than K, for example, an integer multiple of K) compressed vectors having a highest similarity with the query vector can be obtained from the first-level storage resource based on the graph index as the at least one compressed vector.

Specifically, if one node in the graph index represents one original vector, K compressed vectors having a highest similarity with the query vector can be obtained from the first-level storage resource based on the graph index as the at least one compressed vector. If one node in the graph index represents one aggregation vector, a specific quantity of compressed vectors having a highest similarity with the query vector can be obtained from the first-level storage resource based on the graph index, so a total quantity of original vectors included in vector groups to which aggregation vectors corresponding to the compressed vectors belong is not less than the K value. In this case, the compressed vectors included in the vector groups respectively corresponding to the aggregation vectors can be used as the at least one compressed vector.

Step 304: Determine, based on a pre-trained classification model, whether an original vector respectively corresponding to the at least one compressed vector is a candidate vector most similar to the query vector, and obtain at least one target compressed vector corresponding to an original vector being a candidate vector most similar to the query vector.

Step 306: Obtain at least one target original vector corresponding to the at least one target compressed vector from the second-level storage resource.

In this embodiment, in a case in which the at least one compressed vector is obtained, whether an original vector corresponding to each compressed vector is a candidate vector most similar to the query vector can be first determined based on the pre-trained classification model, so at least one compressed vector (which can be referred to as a target compressed vector) whose corresponding original vector is a candidate vector most similar to the query vector can be obtained. A target compressed vector is used as an example, and an original vector corresponding to the target compressed vector can be used as a candidate vector most similar to the query vector.

For the at least one target compressed vector, at least one original vector (which can be referred to as a target original vector) corresponding to the at least one target compressed vector can be obtained from the second-level storage resource. An original vector corresponding to a target compressed vector can be an original vector directly corresponding to the target compressed vector, or can be an original vector included in a vector group to which an aggregation vector corresponding to the target compressed vector belongs. As such, it is no longer necessary to perform a synchronous data access operation on the second-level storage resource in a search process.

In some embodiments, after the at least one target compressed vector is obtained, and when the at least one target original vector corresponding to the at least one target compressed vector is obtained from the second-level storage resource, specifically, after all target compressed vectors are obtained, a data access request corresponding to the second-level storage resource can be initiated (assume that the second-level storage resource is a distributed file system, the data access request can be an I/O request for the distributed file system). In this case, the data access request can be used to obtain the at least one target original vector corresponding to the at least one target compressed vector from the second-level storage resource. Subsequently, a data access result corresponding to the data access request can be obtained, so the at least one target original vector corresponding to the at least one target compressed vector can be obtained from the data access result.

That is, after all target compressed vectors having a highest similarity with the query vector are obtained from the first-level storage resource by completing nearest neighbor search based on the graph index, the target original vectors respectively corresponding to the target compressed vectors can be obtained from the second-level storage resource through one time of data access for the second-level storage resource.

In some embodiments, after the at least one target compressed vector is obtained, and when the at least one target original vector corresponding to the at least one target compressed vector is obtained from the second-level storage resource, specifically, an asynchronous data access request corresponding to the second-level storage resource can be initiated each time a target compressed vector is obtained, where "asynchronous" means that it is unnecessary to bock and wait for a request to be returned after the data access request is initiated. In this case, the data access request can be used to obtain, from the second-level storage resource, the target original vector corresponding to the target compressed vector. After all target compressed vectors are obtained, each initiated data access request corresponding to the second-level storage resource can be used to obtain, from the second-level storage resource, a target original vector corresponding to one target compressed vector. In this case, all data access results corresponding to all initiated data access requests can be obtained, so the at least one target original vector corresponding to the at least one target compressed vector can be obtained from all the data access results.

That is, an asynchronous data access request for the second-level storage resource can be initiated once each time a target compressed vector is obtained from the first-level storage resource by performing nearest neighbor search based on the graph index. But before completion of nearest neighbor search, it is unnecessary to block and wait for obtaining a data access result corresponding to the data access request. Instead, after nearest neighbor search is completed based on the graph index to obtain all target compressed vectors having a highest similarity with the query vector from the first-level storage resource, the target original vectors respectively corresponding to the target compressed vectors are obtained from the second-level storage resource by using obtained data access results corresponding to all initiated data access requests.

In the above-mentioned two manners of obtaining the target original vector, a nearest neighbor search process based on the graph index can be decoupled from a data access operation for the second-level storage resource such as shared storage that is used to store an original vector. A synchronous data access operation does not need to be performed for the second-level storage resource in a search process, but after a compressed vector having a highest similarity with the query vector is obtained by using the search process from the first-level storage resource such as an internal memory used to store the compressed vector corresponding to the original vector and the graph index constructed based on the original vector, an original vector corresponding to the compressed vector is obtained from the second-level storage resource. Thus, a delay of vector retrieval can be reduced.

In some embodiments, each time a target compressed vector is obtained, a synchronous data access request corresponding to the second-level storage resource can be initiated, where "synchronous" means that it is necessary to bock and wait for a request to be returned after the data access request is initiated. In this case, the data access request can be used to obtain a target original vector corresponding to the target compressed vector from the second-level storage resource. As such, after all target compressed vectors are obtained, the at least one target original vector corresponding to the at least one target compressed vector is synchronously obtained from all data access results corresponding to all initiated data access requests.

In this application, to reduce the delay of vector retrieval, a quantity of target compressed vectors can be reduced, that is, not all compressed vectors in the at least one compressed vector obtained from the first-level storage resource and having a highest similarity with the query vector are used as target compressed vectors. By using any one of the at least one compressed vector as an example, whether an original vector corresponding to the compressed vector is a candidate vector most similar to the query vector can be first determined by using the pre-trained classification model. If yes, the compressed vector is used as a target compressed vector; otherwise, the compressed vector may not be used as a target compressed vector.

In some embodiments, the classification model can be specifically a linear binary classification model. The binary classification model can divide input vectors into two types, one of which can be used as a vector of a candidate vector most similar to the query vector, and the other of which may not be used as a vector of a candidate vector most similar to the query vector.

Step 308: Respectively calculate a similarity between the query vector and the at least one target original vector, sort the at least one target original vector based on the calculated similarity, and determine, based on the sorted at least one target original vector, a vector retrieval result corresponding to the query vector.

In this embodiment, for the at least one target original vector corresponding to the at least one target compressed vector obtained from the second-level storage resource, the similarity between the query vector and the target original vectors can be respectively calculated, the target original vectors are sorted based on the calculated similarity, and the vector retrieval result corresponding to the query vector is determined based on the sorted at least one target original vector.

In some embodiments, when the at least one target original vector is sorted based on the calculated similarity, and the vector retrieval result corresponding to the query vector is determined based on the sorted at least one target original vector, specifically, the target original vectors can be sorted in descending order of the calculated similarity, and a predetermined quantity (which can be the K value) of top target original vectors as the vector retrieval result corresponding to the query vector based on the sorted at least one target original vector.

The following describes a training process of the classification model.

In some embodiments, a training sample vector can be obtained. Probability distribution of the training sample vector matches probability distribution of the original vector. Specifically, probability distribution of an element (that is, each component of the vector) in the training sample vector matches probability distribution of an element in the original vector. The probability distribution matching between the two means that the probability distribution of the two is completely the same or basically the same. Each training sample vector is marked with a category label used to indicate whether the training sample vector is a candidate vector most similar to a query sample vector.

In this case, supervised training can be performed on the classification model based on the query sample vector and the training sample vector marked with the category label. For example, the query sample vector and a compressed vector respectively corresponding to the training sample vector can be input into the classification model for classification calculation, so as to adjust a model parameter of the classification model according to a predicted category and the category label respectively corresponding to the training sample vector, so as to implement supervised training on the classification model.

In some embodiments, when the classification model is being trained based on the query sample vector and the training sample vector marked with the category label, specifically, a similarity between a compressed vector corresponding to each training sample vector and a compressed vector corresponding to the query sample vector can be calculated as an approximate similarity between each training sample vector and the query sample vector, and a similarity threshold corresponding to each training sample can be determined. Therefore, the approximate similarity and the similarity threshold can be determined as feature data corresponding to each training sample vector, and supervised training is performed on the classification model based on the feature data and the category label corresponding to each training sample vector.

In an actual application, the similarity threshold can be a similarity threshold used to determine whether the training sample vector is similar to the query sample vector. Similarity thresholds corresponding to different training sample vectors can be different, and can be specifically determined according to other vector attributes of the training sample vectors.

It is worthwhile to note that, in this case, when it is determined, based on the pre-trained classification model, whether the original vector respectively corresponding to the at least one compressed vector is a candidate vector most similar to the query vector, a similarity between each compressed vector and the compressed vector corresponding to the query vector can be calculated as an approximate similarity between the original vector corresponding to each compressed vector and the query sample vector, and a similarity threshold corresponding to each original vector can be determined, so the approximate similarity and the similarity threshold can be determined as feature data corresponding to each compressed vector, and the feature data corresponding to each compressed vector are input into the pre-trained classification model for the classification model to predict whether the original vector corresponding to each compressed vector is a candidate vector most similar to the query vector.

In some embodiments, in a process of performing supervised training on the classification model, a classification decision boundary of the classification model can be adjusted, so a classification recall rate corresponding to a target category is not less than a predetermined threshold. The target category can indicate that a training sample vector can be used as a candidate vector most similar to the query sample vector, that is, a training sample vector belonging to the target category can be used as a candidate vector most similar to the query sample vector.

The classification decision boundary is an important concept in machine learning, especially in supervised learning. It refers to a boundary that separates different types of data points.

For example, for linear classifiers such as logistic regression or linear support vector machines, their classification decision boundaries are linear and can be straight lines (two-dimensional) or hyperplanes (multi-dimensional). For a polynomial classifier, its decision boundary is a polynomial curve and is applicable to non-linear separable data. For a decision tree, its classification decision boundary is defined by segmentation points in a tree structure, and is usually a piecewise constant. For a neural network, its classification decision boundary can be very complex and is determined by a network layer, a weight, and an activation function together.

The shape and location of the classification decision boundary depends on distribution of data, complexity of a selected model, and regularization parameters. In practical applications, it is very important to select a proper model and adjust its parameters to obtain an optimal decision boundary, which helps to improve the accuracy and generalization ability of classification.

In machine learning and statistical classification, a recall rate is also referred to as a true positive rate (TPR) and is an important indicator for evaluating performance of a classification model. The recall rate is defined as: recall rate=true positive/(true positive+false negative). True positive (TP) refers to a quantity of instances correctly predicted by a classification model as positive classes; and false negative (FN) refers to a quantity of positive category instances incorrectly predicted by a classification model as negative classes.

The recall rate measures the capability of a model to identify all actual positive classes. A high recall rate means that a model can capture most positive category instances, but may be accompanied by a relatively high false positive (FP) rate, that is, the model incorrectly predicts a negative category instance as being of a positive category.

When performing vector retrieval, a classification model with a high recall rate is preferred to ensure that any possible candidate vector most similar to a query vector is not omitted. Therefore, the target category used to indicate that a training sample vector can be used as a candidate vector most similar to the query sample vector can be used as a positive category, and the classification decision boundary of the classification model is adjusted, so the recall rate is not less than the predetermined threshold. That is, by adjusting the classification decision boundary of the classification model, the classification recall rate corresponding to the target category is not less than the predetermined threshold.

In the vector retrieval solution provided in this application, a compressed vector corresponding to an original vector can be stored in a first-level storage resource, and the original vector is stored in a second-level storage resource. In addition, it is ensured that data access performance of the first-level storage resource is higher than data access performance of the second-level storage resource. In this case, in response to a query vector, at least one compressed vector having a highest similarity to the query vector can be obtained from the first-level storage resource, and classification decision-marking is first performed on each compressed vector by using a pre-trained classification model, so as to obtain at least one target compressed vector whose corresponding original vector is a candidate vector most similar to the query vector. Then, at least one target original vector corresponding to the at least one target compressed vector is obtained from the second-level storage resource. Subsequently, a similarity between the query vector and the at least one target original vector can be respectively calculated, and the at least one target original vector is sorted based on the calculated similarity, so as to determine, based on the sorted at least one target original vector, a vector retrieval result corresponding to the query vector.

In the above-mentioned manner, a quantity of compressed vectors of a corresponding original vector that need to be obtained from the second-level storage resource whose data access performance is limited can be reduced, so a quantity of times of data access performed for the second-level storage resource and a data volume can be reduced. Thus, a delay of vector retrieval can be reduced.

Corresponding to the embodiment of the vector retrieval method, this application further provides an embodiment of a vector retrieval apparatus.

Referring to FIG. 4, FIG. 4 is a schematic structural diagram illustrating a device, according to an example embodiment of this application. In terms of hardware, the device includes a processor 402, an internal bus 404, a network interface 406, an internal memory 408, and a non-volatile memory 410, and certainly may further include other needed hardware. One or more embodiments of this application can be implemented in a software-based way, for example, the processor 402 reads a corresponding computer program from the non-volatile memory 410 to the internal memory 408, and then runs the computer program. Certainly, in addition to a software implementation, one or more embodiments of this application do not rule out other implementations, such as an implementation of a logic device or a combination of software and hardware. In other words, an execution body of the following processing procedure is not limited to each logical module, and can be hardware or a logic device.

Figure 5:
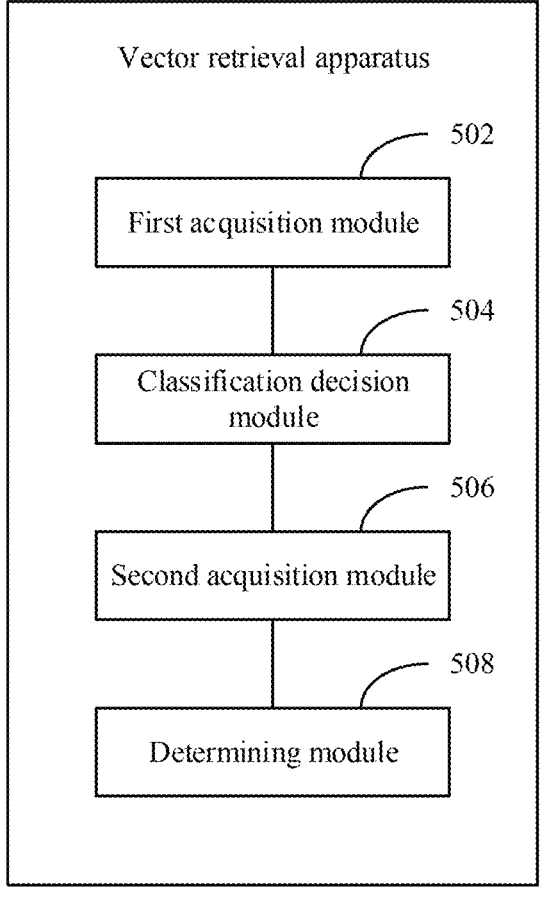
FIG. 5 is a block diagram illustrating a vector retrieval apparatus, according to an example embodiment of this application.

Referring to FIG. 5, FIG. 5 is a block diagram illustrating a vector retrieval apparatus, according to an example embodiment of this application.

The vector retrieval apparatus can be applied to the device shown in FIG. 4, so as to implement the technical solution of this application. A compressed vector corresponding to an original vector is stored in a first-level storage resource; the original vector is stored in a second-level storage resource; data access performance of the first-level storage resource is higher than data access performance of the second-level storage resource; and the apparatus includes: a first acquisition module 502, configured to: in response to a query vector, obtain, from the first-level storage resource, at least one compressed vector having a highest similarity with the query vector; a classification decision module 504, configured to: determine, based on a pre-trained classification model, whether an original vector respectively corresponding to the at least one compressed vector is a candidate vector most similar to the query vector, and obtain at least one target compressed vector corresponding to an original vector being a candidate vector most similar to the query vector; a second acquisition module 506, configured to obtain at least one target original vector corresponding to the at least one target compressed vector from the second-level storage resource; and a determining module 508, configured to: respectively calculate a similarity between the query vector and the at least one target original vector, sort the at least one target original vector based on the calculated similarity, and determine, based on the sorted at least one target original vector, a vector retrieval result corresponding to the query vector.

In some embodiments, the apparatus further includes: a third acquisition module, configured to obtain a training sample vector, where probability distribution of the training sample vector matches probability distribution of the original vector; and each training sample vector is marked with a category label used to indicate whether the training sample vector is a candidate vector most similar to a query sample vector; and a training module, configured to perform supervised training on the classification model based on the query sample vector and the training sample vector marked with the category label.

In some embodiments, the performing supervised training on the classification model based on the query sample vector and the training sample vector marked with the category label includes: calculating a similarity between a compressed vector corresponding to each training sample vector and a compressed vector corresponding to the query sample vector, as an approximate similarity between each training sample vector and the query sample vector, and determining a similarity threshold corresponding to each training sample; and determining the approximate similarity and the similarity threshold as feature data corresponding to each training sample vector, and performing supervised training on the classification model based on the feature data and the category label corresponding to each training sample vector.

In some embodiments, the training module is further configured to: in a process of performing supervised training on the classification model, adjust a classification decision boundary of the classification model, so a classification recall rate corresponding to a target category is not less than a predetermined threshold, where the target category indicates that a training sample vector is a candidate vector most similar to the query sample vector.

In some embodiments, the sorting the at least one target original vector based on the calculated similarity, and determining, based on the sorted at least one target original vector, a vector retrieval result corresponding to the query vector includes: sorting the at least one target original vector in descending order of the calculated similarity, and determining, based on the sorted at least one target original vector, a predetermined quantity of top target original vectors as the vector retrieval result corresponding to the query vector.

In some embodiments, the compressed vector is a vector obtained after product quantization is performed on the original vector.

In some embodiments, the first-level storage resource includes an internal memory; and the second-level storage resource includes a disk.

The apparatus embodiments basically correspond to the method embodiments. Therefore, for related parts, references can be made to partial descriptions in the method embodiments. The described apparatus embodiments are merely illustrative. The modules described as separate parts may or may not be physically separated, and parts displayed as modules may or may not be physical modules, that is, may be located in a same place or may be distributed to multiple network modules. Some or all of the modules or units can be selected based on actual needs to achieve the objectives of the technical solutions in this application.

The system, apparatus, module, or unit illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email receiving/sending device, a game console, a tablet computer, a wearable device, or a combination of any several of these devices.

In a typical configuration, the computer includes one or more central processing units (CPUs), an input/output interface, a network interface, and an internal memory.

The internal memory may include a non-persistent storage, a random access memory (RAM), and/or a nonvolatile memory in a computer-readable medium, for example, a read-only memory (ROM) or a flash read-only memory (flash RAM). The internal memory is an example of the computer-readable medium.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a disk memory, a quantum memory, a graphene-based storage medium, another magnetic storage device, or any other non-transmission medium. The computer storage medium can be configured to store information that can be accessed by a computing device. Based on the definition in this specification, the computer-readable medium does not include transitory media such as a modulated data signal and carrier.

It is worthwhile to note that the terms "include", "contain", or any other variant thereof are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific embodiments of this application are described above. Other embodiments fall within the scope of this specification. In some cases, actions or steps described in the application can be performed in a sequence different from that in the embodiments and desired results can still be achieved. In addition, the process depicted in the accompanying drawings does not necessarily need a particular execution order to achieve the desired results. In some implementations, multi-tasking and concurrent processing are feasible or can be advantageous.

Terms used in one or more embodiments of this application are merely used to describe specific embodiments, and are not intended to limit the one or more embodiments of this application. The terms "a" and "the" of singular forms are also intended to include plural forms, unless otherwise specified in the context clearly. The term "and/or" indicates and includes any or all possible combinations of one or more associated listed items.

Descriptions of the terms "one embodiment", "some embodiments", "example", "specific example", or "one implementation" used in one or more embodiments of this application mean that a specific feature or characteristic described with reference to this embodiment is included in at least one embodiment of this application. A schematic description of these terms is not necessarily with respect to the same embodiment. In addition, the described specific feature or characteristic can be combined in a proper way in one or more embodiments of this application. In addition, without contradicting each other, different embodiments and specific features or characteristics in the different embodiments can be combined.

It should be understood that although terms "first", "second", "third", etc. may be used in one or more embodiments of this application to describe various types of information, the information is not limited to these terms. These terms are only used to distinguish between information of the same type. For example, without departing from the scope of one or more embodiments of this application, first information can also be referred to as second information, and similarly, the second information can be referred to as the first information. Depending on the context, for example, the word "if" used here can be explained as "while", "when", or "in response to determining".

The above-mentioned descriptions are merely preferred embodiments in one or more embodiments of this application, but are not intended to limit the one or more embodiments of this application. Any modification, equivalent replacement, improvement, etc. made without departing from the spirit and principle of the one or more embodiments of this application shall fall within the protection scope of the one or more embodiments of this application.

User information (including but not limited to user equipment information, personal user information, etc.) and data (including but not limited to data used for analysis, stored data, displayed data, etc.) in this application are information and data that are authorized by a user or that are fully authorized by each party. Furthermore, related data need to be collected, used, and processed in compliance with relevant laws, regulations and standards of relevant countries and regions, and corresponding operation entries are provided for the user to choose to authorize or reject.

What is claimed is:

1. A method for vector retrieval, wherein the method comprises:

performing, in response to a query vector, a first retrieval from a first-level storage resource that stores compressed vectors corresponding to original vectors, wherein performing the first retrieval from the first-level storage resource comprises:

obtaining, from the first-level storage resource, at least one compressed vector having a highest similarity with the query vector;

determining, based on a classification model, whether at least one original vector respectively corresponding to the at least one compressed vector is a candidate vector most similar to the query vector; and obtaining at least one target compressed vector corresponding to at least one original vector that is the candidate vector most similar to the query vector; and performing, after the first retrieval from the first-level storage resource, a second retrieval from a second-level storage resource that stores the original vectors and that has a lower data access performance than the first-level storage resource, and wherein performing the second retrieval from the second-level storage resource comprises:

obtaining at least one target original vector corresponding to the at least one target compressed vector from the second-level storage resource;

calculating at least one similarity between the query vector and the at least one target original vector;

sorting the at least one target original vector based on the at least one similarity to obtain sorted at least one target original vector; and determining, based on the sorted at least one target original vector, a vector retrieval result corresponding to the query vector.

2. The method according to claim 1, wherein the method further comprises:

obtaining a training sample vector, wherein probability distribution of the training sample vector matches probability distribution of the original vector, and each training sample vector is marked with a category label used to indicate whether the training sample vector is the candidate vector most similar to a query sample vector; and performing supervised training on the classification model based on the query sample vector and the training sample vector marked with the category label.

3. The method according to claim 2, wherein the performing supervised training on the classification model based on the query sample vector and the training sample vector marked with the category label comprises:

calculating a similarity between a compressed vector corresponding to each training sample vector and a compressed vector corresponding to the query sample vector, as an approximate similarity between each training sample vector and the query sample vector;

determining a similarity threshold corresponding to each training sample;

determining the approximate similarity and the similarity threshold as feature data corresponding to each training sample vector; and performing supervised training on the classification model based on the feature data and the category label corresponding to each training sample vector.

4. The method according to claim 2, wherein the method further comprises:

in a process of performing supervised training on the classification model, adjusting a classification decision boundary of the classification model to make a classification recall rate corresponding to a target category is not less than a predetermined threshold, wherein the target category indicates that a training sample vector is a candidate vector most similar to the query sample vector.

5. The method according to claim 1, wherein the sorting the at least one target original vector based on the at least one similarity to obtain sorted at least one target original vector; and determining, based on the sorted at least one target original vector, a vector retrieval result corresponding to the query vector comprise:

sorting the at least one target original vector in descending order of the at least one similarity to obtain sorted at least one target original vector; and determining, based on the sorted at least one target original vector, a predetermined quantity of top target original vectors as the vector retrieval result corresponding to the query vector.

6. The method according to claim 1, wherein a compressed vector is a vector obtained after product quantization is performed on the original vector.

7. The method according to claim 1, wherein the first-level storage resource comprises an internal memory; and the second-level storage resource comprises a disk.

8. A computer-implemented device comprising:

one or more processors; and one or more tangible, non-transitory, machine-readable media storing one or more instructions that, when executed by the one or more processors, perform operations comprising:

performing, in response to a query vector, a first retrieval from a first-level storage resource that stores compressed vectors corresponding to original vectors, wherein performing the first retrieval from the first-level storage resource comprises:

obtaining, from the first-level storage resource, at least one compressed vector having a highest similarity with the query vector;

determining, based on a classification model, whether at least one original vector respectively corresponding to the at least one compressed vector is a candidate vector most similar to the query vector; and obtaining at least one target compressed vector corresponding to at least one original vector that is the candidate vector most similar to the query vector; and performing, after the first retrieval from the first-level storage resource, a second retrieval from a second-level storage resource that stores the original vectors and that has a lower data access performance than the first-level storage resource, and wherein performing the second retrieval from the second-level storage resource comprises:

obtaining at least one target original vector corresponding to the at least one target compressed vector from the second-level storage resource;

calculating at least one similarity between the query vector and the at least one target original vector;

sorting the at least one target original vector based on the at least one similarity to obtain sorted at least one target original vector; and determining, based on the sorted at least one target original vector, a vector retrieval result corresponding to the query vector.

9. The computer-implemented device according to claim 8, wherein the operations further comprise:

obtaining a training sample vector, wherein probability distribution of the training sample vector matches probability distribution of the original vector, and each training sample vector is marked with a category label used to indicate whether the training sample vector is the candidate vector most similar to a query sample vector; and performing supervised training on the classification model based on the query sample vector and the training sample vector marked with the category label.

10. The computer-implemented device according to claim 9, wherein the performing supervised training on the classification model based on the query sample vector and the training sample vector marked with the category label comprises:

calculating a similarity between a compressed vector corresponding to each training sample vector and a compressed vector corresponding to the query sample vector, as an approximate similarity between each training sample vector and the query sample vector;

determining a similarity threshold corresponding to each training sample;

determining the approximate similarity and the similarity threshold as feature data corresponding to each training sample vector; and performing supervised training on the classification model based on the feature data and the category label corresponding to each training sample vector.

11. The computer-implemented device according to claim 9, wherein the operations further comprise:

in a process of performing supervised training on the classification model, adjusting a classification decision boundary of the classification model to make a classification recall rate corresponding to a target category is not less than a predetermined threshold, wherein the target category indicates that a training sample vector is a candidate vector most similar to the query sample vector.

12. The computer-implemented device according to claim 8, wherein the sorting the at least one target original vector based on the at least one similarity to obtain sorted at least one target original vector; and determining, based on the sorted at least one target original vector, a vector retrieval result corresponding to the query vector comprise:

sorting the at least one target original vector in descending order of the at least one similarity to obtain sorted at least one target original vector; and determining, based on the sorted at least one target original vector, a predetermined quantity of top target original vectors as the vector retrieval result corresponding to the query vector.

13. The computer-implemented device according to claim 8, wherein a compressed vector is a vector obtained after product quantization is performed on the original vector.

14. The computer-implemented device according to claim 8, wherein the first-level storage resource comprises an internal memory; and the second-level storage resource comprises a disk.

15. A non-transitory, computer-readable medium storing one or more instructions executable by a computer system to perform operations comprising performing, in response to a query vector, a first retrieval from a first-level storage resource that stores compressed vectors corresponding to original vectors, wherein performing the first retrieval from the first-level storage resource comprises:

obtaining, from the first-level storage resource, at least one compressed vector having a highest similarity with the query vector;

determining, based on a classification model, whether at least one original vector respectively corresponding to the at least one compressed vector is a candidate vector most similar to the query vector; and obtaining at least one target compressed vector corresponding to at least one original vector that is the candidate vector most similar to the query vector; and performing, after the first retrieval from the first-level storage resource, a second retrieval from a second-level storage resource that stores the original vectors and that has a lower data access performance than the first-level storage resource, and wherein performing the second retrieval from the second-level storage resource comprises:

obtaining at least one target original vector corresponding to the at least one target compressed vector from the second-level storage resource;

calculating at least one similarity between the query vector and the at least one target original vector;

sorting the at least one target original vector based on the at least one similarity to obtain sorted at least one target original vector; and determining, based on the sorted at least one target original vector, a vector retrieval result corresponding to the query vector.

16. The non-transitory, computer-readable medium according to claim 15, wherein the operations further comprise:

obtaining a training sample vector, wherein probability distribution of the training sample vector matches probability distribution of the original vector, and each training sample vector is marked with a category label used to indicate whether the training sample vector is the candidate vector most similar to a query sample vector; and performing supervised training on the classification model based on the query sample vector and the training sample vector marked with the category label.

17. The non-transitory, computer-readable medium according to claim 16, wherein the performing supervised training on the classification model based on the query sample vector and the training sample vector marked with the category label comprises:

calculating a similarity between a compressed vector corresponding to each training sample vector and a compressed vector corresponding to the query sample vector, as an approximate similarity between each training sample vector and the query sample vector;

determining a similarity threshold corresponding to each training sample;

determining the approximate similarity and the similarity threshold as feature data corresponding to each training sample vector; and performing supervised training on the classification model based on the feature data and the category label corresponding to each training sample vector.

18. The non-transitory, computer-readable medium according to claim 16, wherein the operations further comprise:

in a process of performing supervised training on the classification model, adjusting a classification decision boundary of the classification model to make a classification recall rate corresponding to a target category is not less than a predetermined threshold, wherein the target category indicates that a training sample vector is a candidate vector most similar to the query sample vector.

19. The non-transitory, computer-readable medium according to claim 15, wherein the sorting the at least one target original vector based on the at least one similarity to obtain sorted at least one target original vector; and determining, based on the sorted at least one target original vector, a vector retrieval result corresponding to the query vector comprise:

sorting the at least one target original vector in descending order of the at least one similarity to obtain sorted at least one target original vector; and determining, based on the sorted at least one target original vector, a predetermined quantity of top target original vectors as the vector retrieval result corresponding to the query vector.

20. The non-transitory, computer-readable medium according to claim 15, wherein a compressed vector is a vector obtained after product quantization is performed on the original vector.

21. The non-transitory, computer-readable medium according to claim 15, wherein the first-level storage resource comprises an internal memory; and the second-level storage resource comprises a disk.

* * * * *